(12) United States Patent
Wallace

(10) Patent No.: US 8,684,221 B2
(45) Date of Patent: Apr. 1, 2014

(54) PASTRY TRAY

(76) Inventor: Keith Edward Wallace, Brooklyn Center, MN (US)

( * ) Notice: Subject to any disclaimer, the term of this patent is extended or adjusted under 35 U.S.C. 154(b) by 807 days.

(21) Appl. No.: 12/173,529

(22) Filed: Jul. 15, 2008

(65) Prior Publication Data

US 2010/0015310 A1    Jan. 21, 2010

(51) Int. Cl.
*A47G 19/00* (2006.01)
*A47G 19/22* (2006.01)

(52) U.S. Cl.
USPC .......................... 220/575; 220/713; 220/719

(58) Field of Classification Search
USPC ......... 220/574, 575, 713–715, 719, 731, 729, 220/745, 749, 88.2, 568, 574.2, 501, 505, 220/506, 694; 248/94; 426/106; 206/217, 206/218
See application file for complete search history.

(56) References Cited

U.S. PATENT DOCUMENTS

| | | |
|---|---|---|
| 523,068 A | 7/1894 | Gaul |
| 1,087,101 A | 2/1914 | Perry |
| 1,266,308 A | 5/1918 | Peck et al. |
| 2,604,976 A | 7/1952 | Adolf |
| 2,693,751 A | 11/1954 | Allen |
| 2,749,836 A | 6/1956 | Wedge |
| 3,357,590 A * | 12/1967 | Safford ...................... 220/23.83 |
| 3,819,080 A | 6/1974 | Bird |
| 3,906,848 A | 9/1975 | Gow |
| 4,018,355 A * | 4/1977 | Ando ............................. 220/522 |
| 4,022,257 A * | 5/1977 | O'Connell ...................... 141/98 |
| 4,027,779 A | 6/1977 | De Long |
| 4,331,255 A * | 5/1982 | Fournier ..................... 220/257.2 |
| 4,334,557 A * | 6/1982 | YaSenka .......................... 141/98 |
| D272,222 S * | 1/1984 | Cho ................................ D7/667 |
| 4,452,581 A * | 6/1984 | Panehal ......................... 425/464 |
| 5,060,820 A * | 10/1991 | Boerner ......................... 220/574 |
| 5,505,121 A | 4/1996 | Spector |
| 5,531,347 A | 7/1996 | Goulding |
| 5,758,452 A * | 6/1998 | Matteucci et al. ........... 47/41.01 |
| 5,820,016 A | 10/1998 | Stropkay |
| 6,325,213 B1 * | 12/2001 | Landis, II ..................... 206/519 |
| 6,367,409 B1 * | 4/2002 | Broom ............................ 118/13 |
| 6,553,897 B2 | 4/2003 | Mach |
| 7,487,881 B2 * | 2/2009 | Watzke et al. ................ 220/501 |
| 2006/0086756 A1 * | 4/2006 | Roth et al. .................... 222/129 |
| 2006/0118453 A1 | 6/2006 | Hillebrecht |

\* cited by examiner

*Primary Examiner* — Mickey Yu
*Assistant Examiner* — Shawn Braden
(74) *Attorney, Agent, or Firm* — Merchant & Gould P.C.

(57) ABSTRACT

A pastry tray includes a body having an outer region and an inner region. The inner region includes at least one aperture extending therethrough. The pastry tray also typically includes at least one leg extending at least partially vertically downward from the body. When the pastry tray is arranged on a container containing a heated liquid, heat and steam from the heated liquid pass through the at least one aperture. When a pastry is arranged on the pastry tray, the heat and steam act to warm, and in some cases soften, the pastry.

23 Claims, 16 Drawing Sheets

PASTRY TRAY

BACKGROUND

Heated beverages are often consumed along with a selected pastry. Many have found the flavors and textures of the pastry and the heated beverage to compliment one another and provide an enjoyable pair. Coffee, for example, is often paired with a pastry such as a doughnut, bagel, or muffin. Similarly, soup is often paired with bread or crackers.

Heated beverages such as coffee and tea are typically contained within a cup or a mug, while soup is typically contained within a bowl or a cup. The accompanying pastry is sometimes held in the hand or placed on a napkin or small plate that is arranged on a table near the heated beverage. Sometimes a pastry, such as a cracker, is crumbled directly into a hot soup. At other times it is preferred to dip a pastry, such as a doughnut or bread, into the hot liquid to warm and soften the pastry prior to consumption.

One particular type of pastry is generally known as a stroopwafel (which translates into English as "syrup waffle"). A stroopwafel is typically made of two thin layers of a baked flour batter with a caramel-like syrup filling in the middle. When served at room temperature, stroopwafels are somewhat hard due to crystallization of the syrup filling. Stroopwafels are sometimes referred to by other names, such as sirupwaffels, carmel wafers, or syrup waffles.

SUMMARY

In general terms, this disclosure is directed to a tray for supporting a pastry. In one possible configuration and by non-limiting example, the tray includes a body arranged and configured to support a stroopwafel on a container holding a heated liquid.

One aspect is a tray for supporting a pastry on a container or on a generally flat surface, the container having a sidewall and a bottom defining a volume for containing a heated liquid, the sidewall defining a rim. The tray comprises a body including an outer region and an inner region. The outer region has a first top surface and a substantially planar first bottom surface. The first bottom surface is arranged and configured to rest on the rim of the container when arranged on the container. The inner region is surrounded by and connected to the outer region and includes a substantially planar second top surface and a second bottom surface. The second top surface is sized to support the pastry thereon. The inner region further includes a plurality of apertures extending between the second top surface and the second bottom surface to allow heat and steam from the heated liquid to pass through the body to interact with the pastry.

Another aspect is a tray for supporting a pastry on a container and on a generally flat surface, the container having a sidewall and a bottom defining a volume for containing a heated liquid, the sidewall defining a rim, the tray comprising: a body including: an outer region having a substantially planar first top surface and a substantially planar first bottom surface, the first bottom surface being arranged and configured to rest on the rim of the container when arranged on the container, the outer region having an outer periphery; an inner region surrounded by and connected to the outer region and including a substantially planar second top surface and a substantially planar second bottom surface, the second top surface arranged and configured to support the pastry thereon, the inner region further including a plurality of apertures extending between the second top surface and the second bottom surface to allow steam from the heated liquid to pass through the body to interact with the pastry; and at least three flexible legs spaced from each other and each being connected to the outer periphery of the outer region, the flexible legs being bendable between a first position, in which the legs extend generally parallel to the body, and a second position, in which the legs extend at least partially in a direction normal to the first bottom surface of the body.

Yet another aspect is a pastry support system comprising a pastry tray and further comprising a cover arranged and configured to enclose a pastry between the tray and the cover.

A further aspect is a method of using a pastry tray. The method comprises arranging a pastry onto a substantially planar top surface of a pastry tray such that the pastry is adjacent to at least one aperture extending through the pastry tray; arranging the pastry tray onto a container containing a heated liquid; and allowing the pastry to remain on the pastry tray on the container for a period of time while heat and steam from the heated liquid warm and soften the pastry.

DETAILED DESCRIPTION

Figure 1:
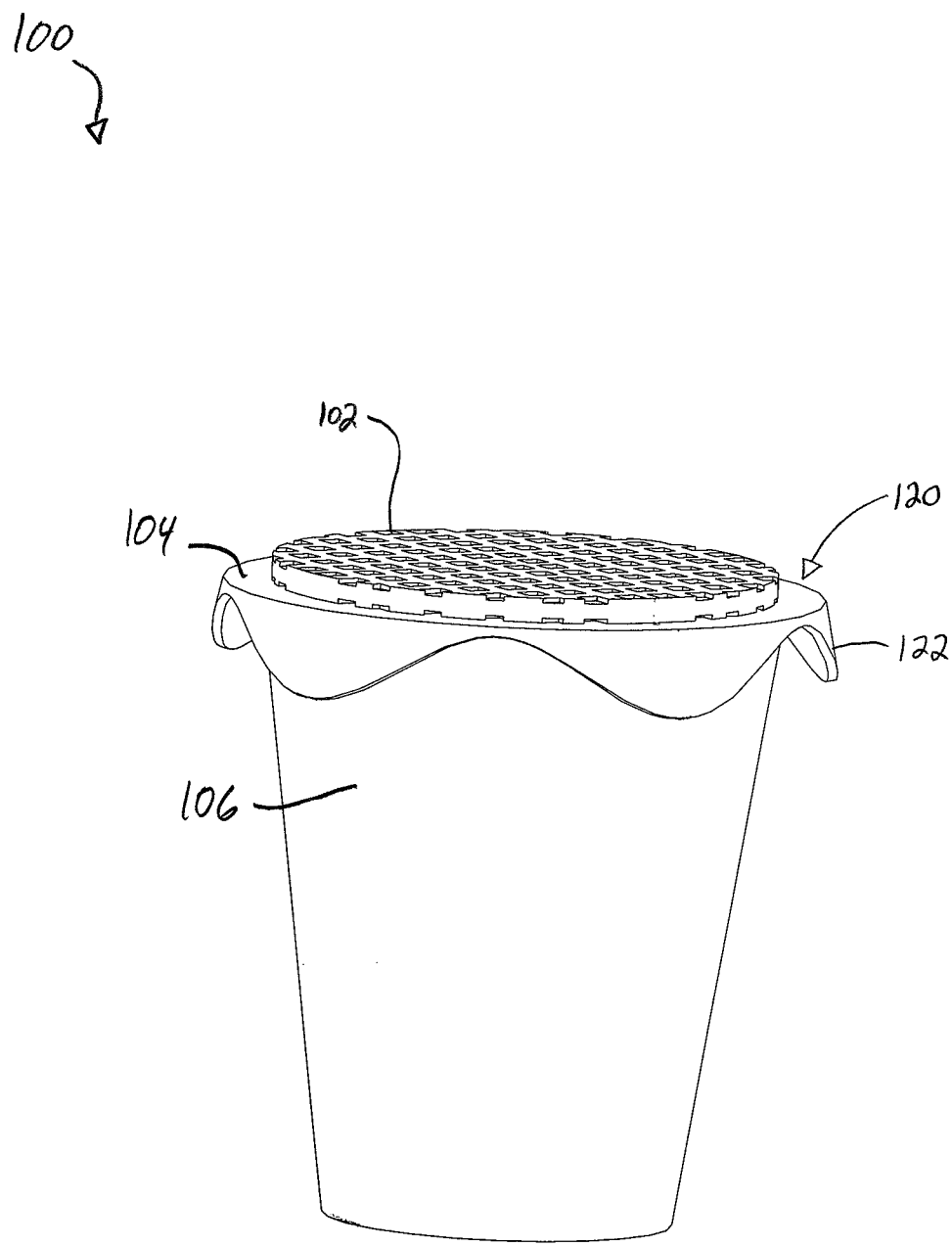
FIG. 1 is a perspective view of an exemplary pastry support system according to the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a perspective view of an exemplary pastry support system 100. Pastry support system 100 includes pastry 102, tray 104, and a container 106. FIG. 1 also illustrates an exemplary pastry warming system.

Pastry 102 is a food item typically made with flour, potato, or other ingredients high in starch. Examples of pastry 102 include a doughnut, cookie, cake, cracker, waffle, pancake, lefsa, muffin, bread, roll, and other high starch food items. One particular example of a pastry 102 is a stroopwafel (which translates into English as "syrup waffle"). A stroopwafel is typically made of two thin layers of a baked flour batter with a caramel-like syrup filling in the middle. When served at room temperature, stroopwafels are somewhat hard due to crystallization of the syrup filling. When warmed and moistened, the stroopwafel softens to a consistency that is easier and more enjoyable to consume. Stroopwafels typically have a diameter in a range from about 3 inches to about 4 inches, and more typically in a range from about 3.4 inches to about 3.6 inches. Other embodiments are used with stroopwafels having a diameter in a range from about 2.9 inches to about 3.6 inches. Other embodiments utilize stroopwafels having other dimensions.

Tray 104 is suitable for supporting pastry 102 thereon. Tray 104 is described in more detail below.

Container 106 is a vessel suitable for containing a liquid, and preferably a heated liquid. A heated liquid is typically a liquid having a temperature greater than about room temperature (often greater than about equal to 21° C. (70° F.)) and less than or about equal to the boiling point of the liquid (for water, typically about 100° C. (212° F.)). Examples of container 106 include a coffee mug, disposable cup (such as a Styrofoam® brand cup or a paper cup), drink glass (which can be made from a variety of materials including glass and plastic), tea cup, soup cup, bowl, vacuum flask (such as a Thermos® vacuum flask), or other containers suitable for containing a heated liquid. Examples of liquids include coffee and coffee-based drinks, tea, water, milk, carbonated beverages, alcoholic beverages, pasta sauce, soup, or other beverages or liquid-based food items. Other embodiments are also used to hold non-liquid based food items, such as pasta and other food items.

Figure 3:
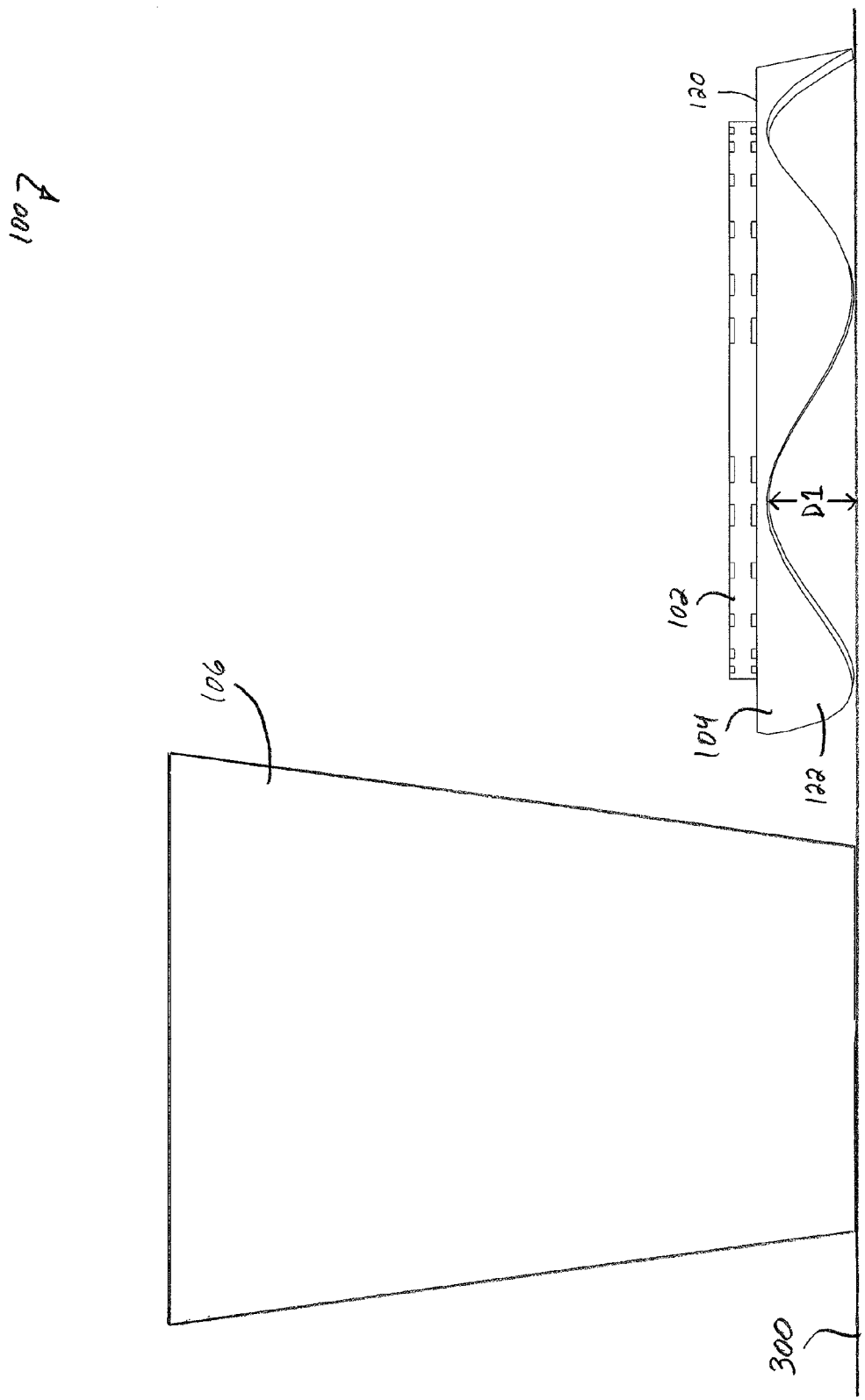
FIG. 3 is a side elevational view of the pastry support system shown in FIG. 1.

Pastry support system 100 typically includes at least two arrangements. A first arrangement is illustrated in FIG. 1, in which tray 104 is arranged on top of container 106. A second arrangement is illustrated in FIG. 3, in which tray 104 is arranged on a generally flat surface, such as a tabletop.

When in the first arrangement, tray 104 supports pastry 102 above the container 106 including a heated liquid. Heat and steam from the heated liquid act to warm, and in some cases soften, pastry 102.

When in the second arrangement, tray 104 supports pastry 102 above a generally flat surface, such as a tabletop. The second arrangement separates pastry 102 and tray 104 from container 106. This allows a person to access the heated liquid within container 106, such as to drink the heated liquid or to dip the pastry 102 into the heated liquid. Tray 104 provides a sanitary surface that is spaced from the tabletop onto which the pastry may be placed.

Figure 2:
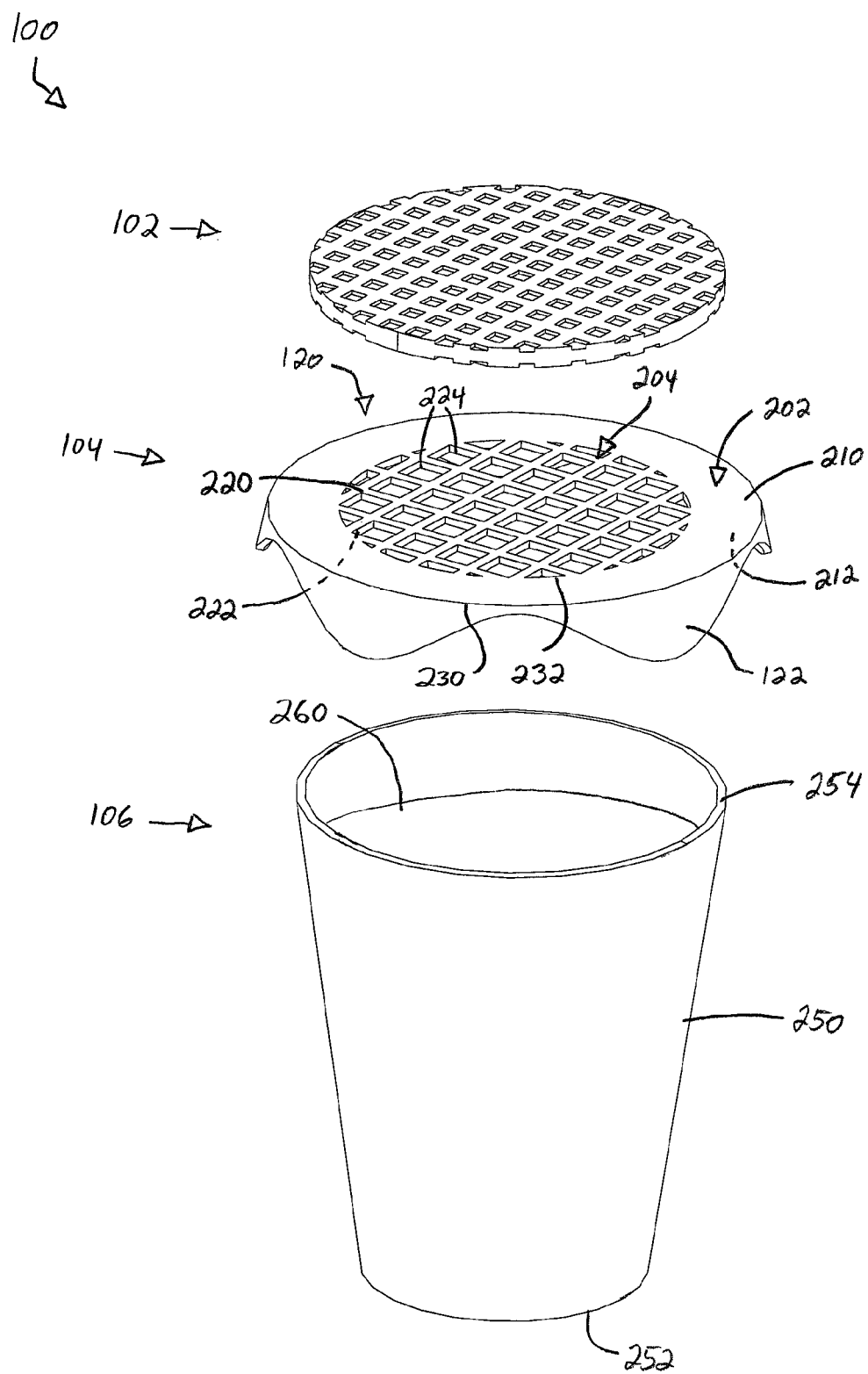
FIG. 2 is an exploded perspective view of the pastry support system shown in FIG. 1.

FIG. 2 is an exploded perspective view of the exemplary pastry support system 100. Pastry support system 100 includes pastry 102, tray 104, and container 106. Tray 104 includes body 120 and legs 122. Body 120 includes outer region 202 and inner region 204. Outer region 202 includes top surface 210, bottom surface 212, and outer periphery 230. Inner region 204 includes top surface 220, bottom surface 222, one or more apertures 224, and outer periphery 232. Container 106 includes sidewall 250, bottom 252, and rim 254. Legs 122 are not included in all embodiments.

In some embodiments, outer region 202 is generally ring-shaped and surrounds inner region 204. Outer region 202 includes top surface 210 and bottom surface 212. Top and bottom surfaces 210 and 212 are typically substantially planar regions. Outer region 202 includes outer periphery 230. Outer periphery 230 is circular in some embodiments. In other embodiments, outer periphery 230 has other shapes, including shapes having a non-constant radius, multi-sided shapes (including triangular, square, rectangular, etc.) or other suitable shapes.

Outer region 202 is typically a region that has no apertures extending between top surface 210 and bottom surface 212. However, some embodiments do include one or more apertures. In some embodiments outer region 202 includes ridges, bumps, protrusions, recesses or other features. In other embodiments, outer region 202 is generally free of ridges, bumps, protrusions, and recesses, such that one or both surfaces 210 and 212 of outer region 202 are smooth.

In some embodiments, top surface 210 of outer region 202 is a printable surface. For example, in some embodiments a logo, text, symbol, or other image, such as an advertisement, is printed on top surface 210. Some embodiments include a logo, text, symbol, or other image on surfaces 212, 220, 222, or on one or more legs 122. Other embodiments include a logo, text, symbol, or other image on other surfaces or combinations of surfaces of tray 104.

For example, some embodiments of tray 104 include ridges or grooves formed in top surface 210 of outer region 202. The ridges or grooves act to collect moisture present on top surface 210. In some embodiments, ridges or grooves are formed to collect and guide moisture from top surface 210 toward inner region 204 so that the moisture will return to container 106 through the apertures in inner region 204.

In some embodiments bottom surface 212 is configured to rest on a rim 254 of container 106. Bottom surface 212 is sized to fit over a variety of different rims having different rim shapes and diameters. As a result, bottom surface 212 acts to provide universal container engagement. Bottom surface 212 is typically smooth to at least partially seal with rim 254 of container 106, to prevent or at least reduce the amount of heat and steam that passes between bottom surface 212 and rim 254. However, in alternate embodiments, bottom surface 212 includes ridges or grooves. Such ridges or grooves may provide various advantages, such as by providing a stronger seal between bottom surface 212 and rim 254, or for collecting or guiding moisture that collects on bottom surface 212.

In some embodiments, inner region 204 is generally circular or disk-shaped and surrounded by outer region 202. In other embodiments, inner region 204 has other shapes including shapes having a non-constant radius, multi-sided shapes (including triangular, square, rectangular, etc.) or other suitable shapes.

Inner region 204 includes top surface 220, bottom surface 222, and apertures 224. Top surface 220 is typically substantially planar, and is arranged and configured to support pastry 102 thereon. In some embodiments, bottom surface 222 is also substantially planar.

In some embodiments, inner region 204 is configured to support a pastry as it is in various stages of consumption, such as after one or more bites have been taken out of pastry 102. Apertures 224 are sized small enough such that inner region 204 is able to support remaining portions of pastry 102. For example, a whole pastry 102 may initially be placed on tray 104. The pastry is then removed, and a portion is consumed. The remaining portion may then be returned to the tray 104 where it continues to be adequately supported. Further, if pastry 102 were to break into multiple pieces, tray 104 is configured to support the pieces of pastry 102 in some embodiments. Sizes of apertures 224 are sized differently in different embodiments to support different pastry 102 piece sizes. In yet other embodiments, tray 104 includes apertures of various sizes, such that the pieces may be configured over apertures that are suitable for the particular pastry 102 piece sizes.

Inner and outer regions 204 and 202 are typically joined at outer periphery 232 of inner region 204. In some embodiments, inner and outer regions 204 and 202 are parallel with each other. More specifically, some embodiments include top surface 210 and top surface 220 that share a common plane. Similarly, some embodiments include bottom surface 212 and bottom surface 222 that share a common plane. However, such arrangements are not required by all embodiments. For example, in some embodiments top surfaces 210 and 220 are arranged in parallel, but not the same planes. The same goes for bottom surfaces 212 and 222. Further, not all surfaces are planar or substantially planar.

Tray 104 includes one or more legs 122. Legs 122 are typically connected to outer periphery 230 of body 120, but are connected to other locations of body 120 in other embodiments. When in use, legs 122 typically extend at least partially in a direction normal to bottom surface 212 of body 120. In some embodiments legs 122 are rigid to prevent bending. In other embodiments, legs 122 are flexible to allow legs 122 to be arranged in various positions.

Legs 122 aid in alignment of tray 104 on top of container 106. For example, legs 122 allow the user to quickly align tray 104 with container 106 enough that tray 104 will be stably supported on rim 254. In addition, once tray 104 is arranged on top of container 106, legs 122 act to reduce the chance that tray 104 will be inadvertently knocked or slid off of container 106. If tray 104 is knocked or slid, legs 122 will eventually come into contact with sidewall 250 of container 106 to stop movement of tray 104 relative to container 106.

In some embodiments, a single leg is provided. For example, a cylindrical or generally cylindrical leg extends generally vertically downward from body 120. In other embodiments, two legs are provided. For example, rather than a cylindrical leg, the legs include two approximately half-cylinders that are spaced from each other. Other embodiments include three or more legs, where each leg is spaced from an adjacent leg. An embodiment including five legs is illustrated in FIG. 2. The legs are formed of a generally sinusoidal shape. Other embodiments include legs in other shapes and configurations, such as triangular, rectangular, etc. Space between each leg provides a handle region that may be grasped by a user to easily move tray 104 from container 106 or a generally flat surface.

In some embodiments, legs 122 are bumps, ridges, or protrusions that extend from bottom surface 212 of outer region 202. In other embodiments, legs 122 are bumps, ridges, or protrusions that extend from bottom surface 222 of inner region 204. In yet other embodiments, bumps, ridges, or protrusions are provided in addition to legs 122, such as to guide the placement of tray 104 onto container 106.

Container 106 typically includes sidewall 250 and bottom 252. Bottom 252 is connected to sidewall 250 to define a volume suitable for containing a liquid, such as a heated liquid. An edge of sidewall 250 typically defines a rim 254 at the top end of container 106. Rim 254 is typically circular in shape, but some embodiments include non-circular shapes.

FIG. 3 is a side elevation view of the pastry support system 100. FIG. 3 shows pastry support system 100 in a second arrangement, in which tray 104 is supporting pastry 102 on a generally flat surface 300. Pastry support system 100 includes pastry 102, tray 104, container 106, and generally flat surface 300.

The second arrangement of pastry support system 100 continues to provide a convenient support surface for pastry 102 on tray 104. Further, the second arrangement provides access to container 106 and the heated liquid contained therein. This arrangement is useful, for example, when a person desires to drink the heated liquid, add cream or sugar to the heated liquid, or to dip pastry 102 into the heated liquid.

Tray 104 includes legs 122 that maintain a space D1 between body 120 and generally flat surface 300. The space D1 ensures that pastry 102 does not come into contact with generally flat surface 300. As a result, tray 104 keeps pastry 102 from getting dirty or intermixing with food, liquid, or contaminants that may be present on generally flat surface 300.

Figure 4:
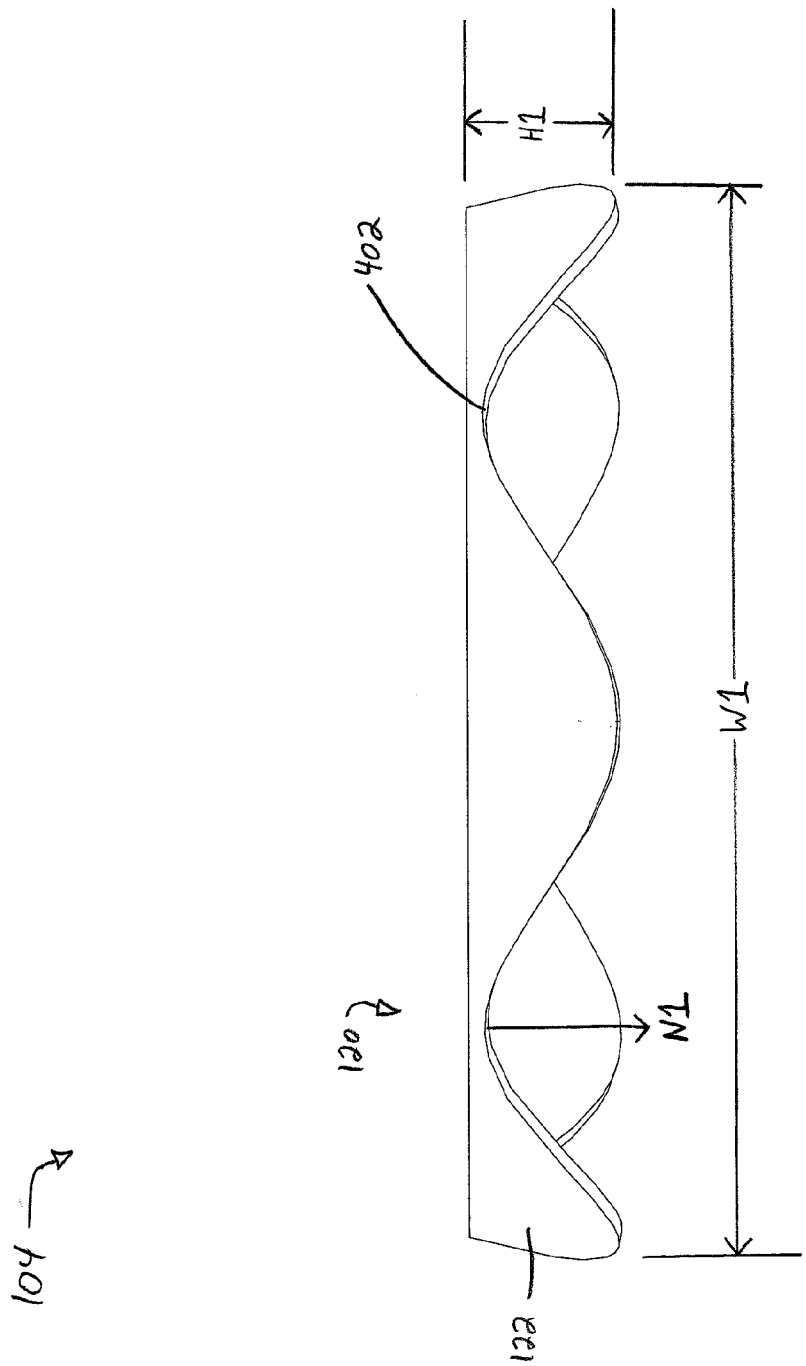
FIG. 4 is a side elevational view of an exemplary tray of the system shown in FIG. 1.

FIG. 4 is a side elevational view of exemplary tray 104. Tray 104 includes body 120, legs 122, and handle portion 402.

Direction N1 is a direction normal to a bottom surface of body 120. As discussed above, legs 122 typically extend out from body 120 at least partially in direction N1. In some embodiments, legs 122 extend parallel with direction N1. In other embodiments, legs 122 are angled to direction N1 but at least partially in direction N1.

The size of some embodiments of tray 104 is illustrated in FIG. 4. The overall height of tray 104 is shown as height H1. Height H1 is typically in a range from about 0.2 inches to about 6 inches. Heights as large as 6 inches or more are useful, for example, for supporting tray 104 above container 106. More preferably, height H1 is in a range from about 0.5 inches to about 1 inch. Other embodiments include other heights.

The overall width of tray 104 is shown as width W1. Width W1 is typically in a range from about 3 inches to about 12 inches. Widths as large as 12 inches or more are useful, for example, for use over a large bowl. More preferably, width W1 is in a range from about 4 inches to about 6 inches. Other embodiments include other widths.

Figure 5:
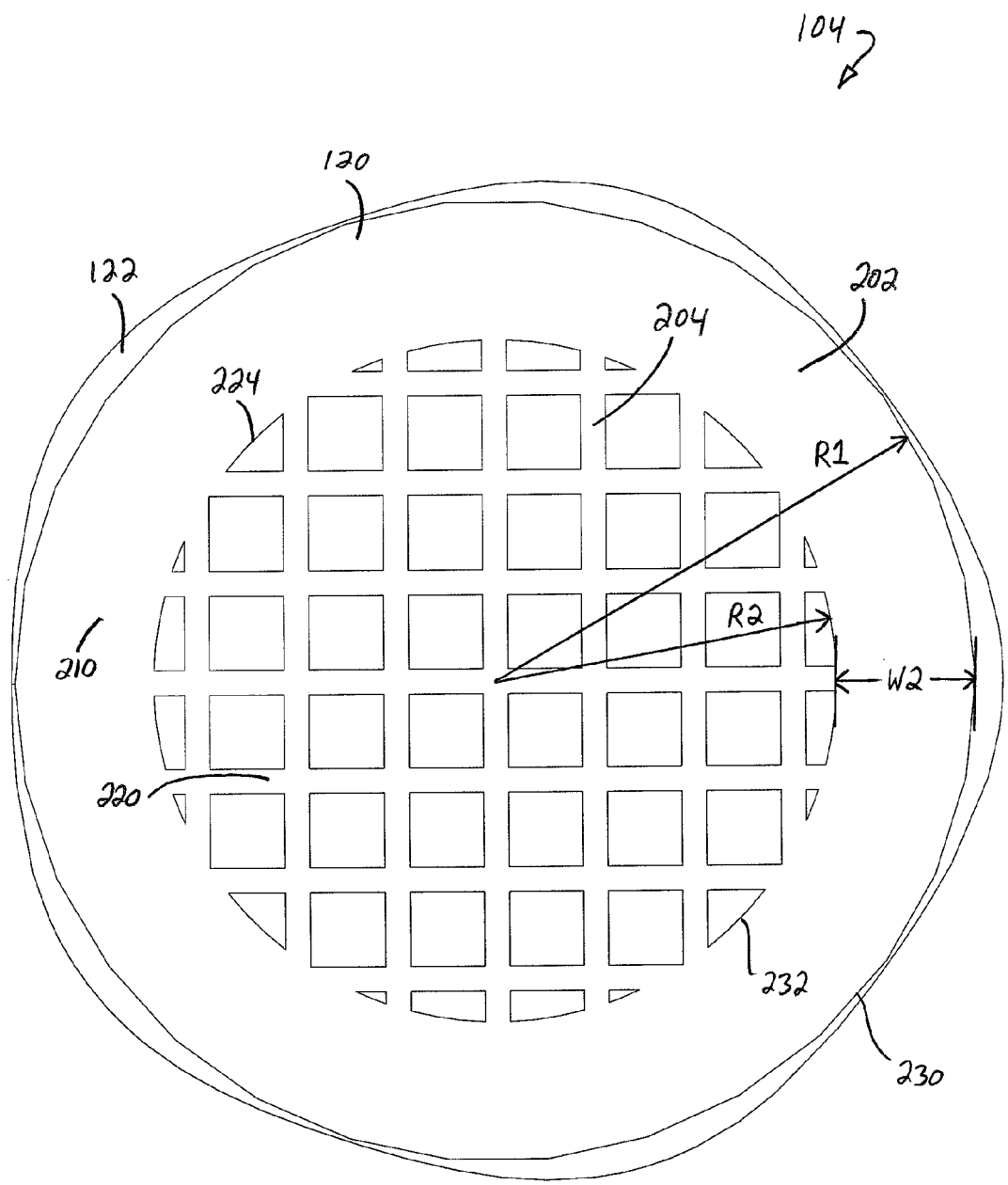
FIG. 5 is a top plan view of the tray shown in FIG. 4.
Figure 6:
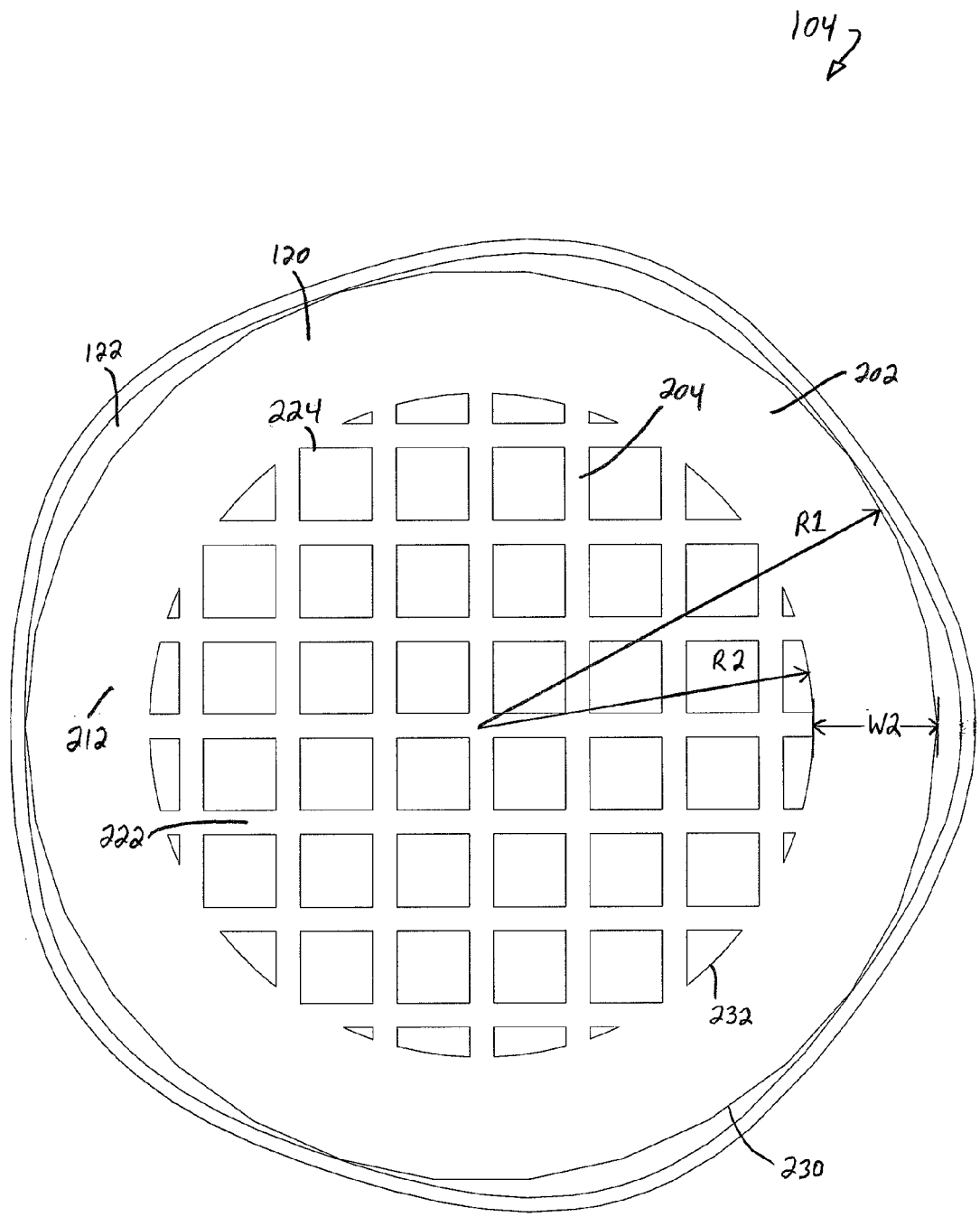
FIG. 6 is a bottom plan view of the tray shown in FIG. 4.

FIGS. 5 and 6 illustrate further details of exemplary tray 104. FIG. 5 is a top plan view. FIG. 6 is a bottom plan view. Tray 104 includes body 120 and legs 122. Body 120 includes outer region 202 and inner region 204. Outer region 202 includes top surface 210, bottom surface 212, and outer periphery 230. Inner region 204 includes top surface 220, bottom surface 222, one or more apertures 224, and outer periphery 232.

Outer region 202 has a width W2 defined by the distance between outer periphery 230 of outer region 202 and the outer periphery 232 of inner region 204. Some embodiments include a generally constant width throughout outer region 202. Other embodiments include varying widths. W2 is typically in a range from about 0.2 inches to about 4 inches, and preferably in a range from about 0.5 inches to about 2 inches. Other embodiments include other widths.

Some embodiments include generally circular outer peripheries 230 and 232. As a result, the size of inner and outer regions 204 and 202 may be described in terms of a radius R1 of outer periphery 230 and a radius R2 of outer periphery 232. In some embodiments, width W2 is the difference between radius R1 and radius R2.

Radius R1 is typically in a range from about 1.5 inches to about 6 inches, and preferably in a range from about 2 inches to about 3 inches. Radius R2 is typically in a range from about 1 inch to about 5 inches, and preferably from about 1.5 inches to about 2.5 inches. Other embodiments include other dimensions.

Figure 7:
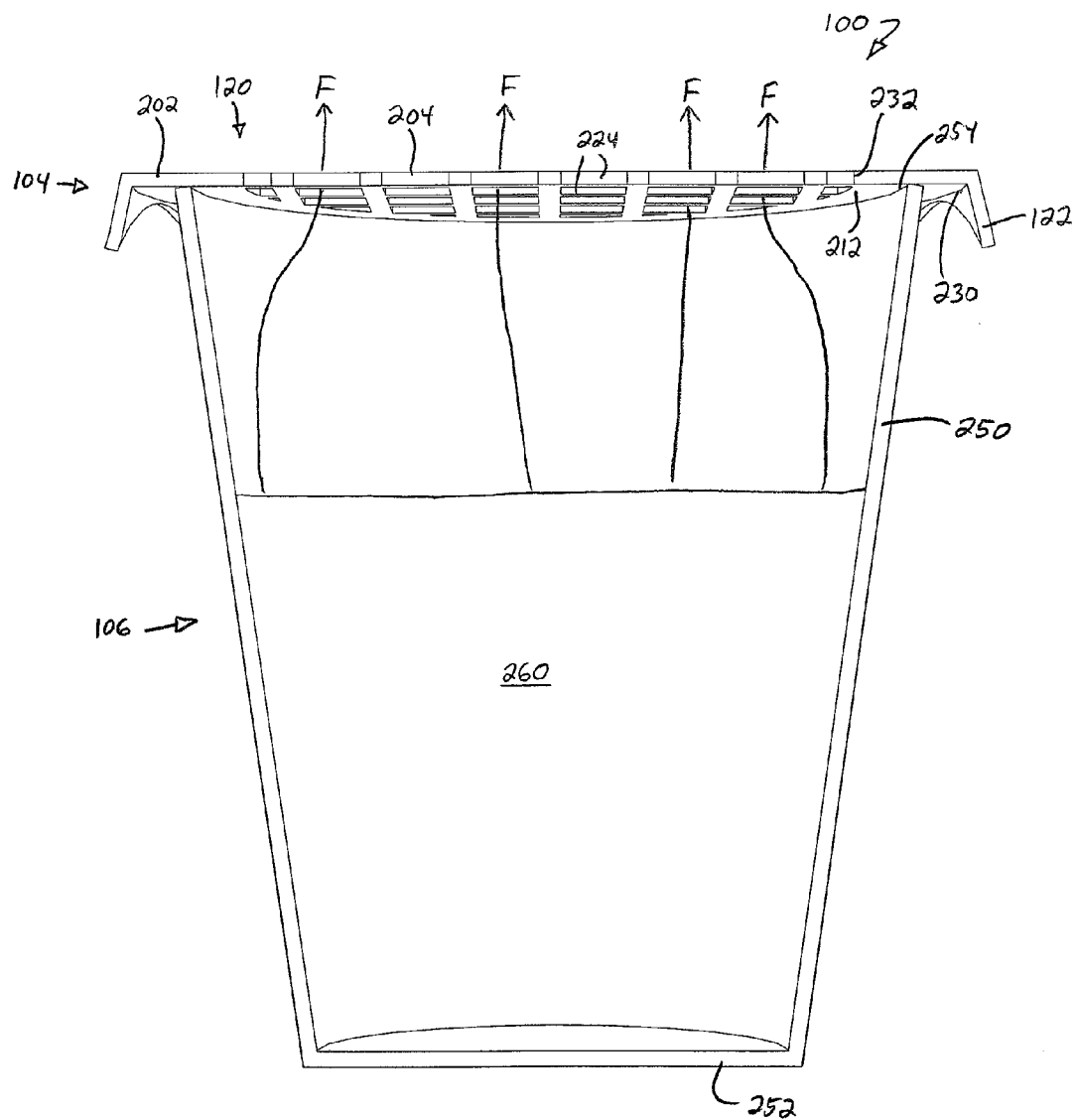
FIG. 7 is a cross-sectional side elevational view of the system shown in FIG. 1.

FIG. 7 is a cross-sectional side elevational view of the exemplary pastry support system 100, including tray 104 and container 106. Tray 104 includes body 120 and legs 122. Body 120 includes outer region 202, inner region 204, and legs 122. Outer region 202 includes bottom surface 212. Inner region 204 includes apertures 224. Container 106 includes sidewall 250, bottom 252, and rim 254. Liquid 260 is contained by container 106. The liquid is typically heated by one of a variety of known water heating techniques. Flowpaths F of heat and steam are schematically illustrated.

When tray 104 is arranged on container 106, bottom surface 212 forms a seal, or partial seal, with rim 254 of container 106. As a result, bottom surface 212 acts to insulate pastry support system 100 from unnecessary heat loss. Further, bottom surface 212 redirects heat and steam from heated liquid 260 (schematically illustrated by flowpaths F) toward inner region 204 to direct some of the heat and steam through apertures 224 so as to interact with the pastry.

In some embodiments, the size of inner region 204 is about equal to the size of a pastry, such as a stroopwafel. The size of inner region 204 allows heat and steam from heated liquid 260 to interact with at least one surface of the pastry, while preventing unnecessary heat loss around the pastry. In some embodiments, the size of inner region 204 is slightly smaller than the size of the pastry. In this way, the pastry covers the apertures to at least partially block heat and steam from passing through inner region 204. Some embodiments include alternative shapes and configurations to match the intended pastry. For example, a tray intended for use with a ring-shaped doughnut may include a central region within inner region 204. The central region does not include apertures to reduce unnecessary heat and steam loss through the hole of the doughnut. Other embodiments include other arrangements.

The embodiment illustrated in FIG. 7 shows a container having a diameter that aligns generally along a center of outer region 202. As noted above, the size, shape, and configuration of outer region 202 allows tray 104 to be compatible with containers having a variety of sizes. As a result, some embodiments of tray 104 have a one-size-fits-many configuration. A one-size-fits-many configuration allows tray 104 to be paired with many different sized containers, rather than being designed to be paired only with a container having a single predetermined size. For example, many cafes and restaurants sell beverages in multiple different sized containers. The sizes often include, for example, small, medium, and large containers. Often, each of the containers includes a rim having a different diameter. One-size-fits-many configurations of tray 104 are arranged and configured to be supported on the rim of any of the various sized containers. In this way, only a single tray size is needed for pairing with any of the various sized containers.

For example, one embodiment of tray 104 has an outer region 202 that is sized to rest on top of a container having a diameter about equal to the diameter of outer periphery 230. Similarly, the same tray 104 is also sized to rest on top of a container having a smaller diameter, such as having a diameter of about equal to the diameter of outer periphery 232. Further, the tray 104 is also sized to rest on top of a container having a diameter between the outer periphery 230 and the outer periphery 232.

In some embodiments the diameter of container 106 may be any diameter less than the diameter of outer periphery 230. Further, in some embodiments containers smaller than outer periphery 232 are used.

Figure 8:
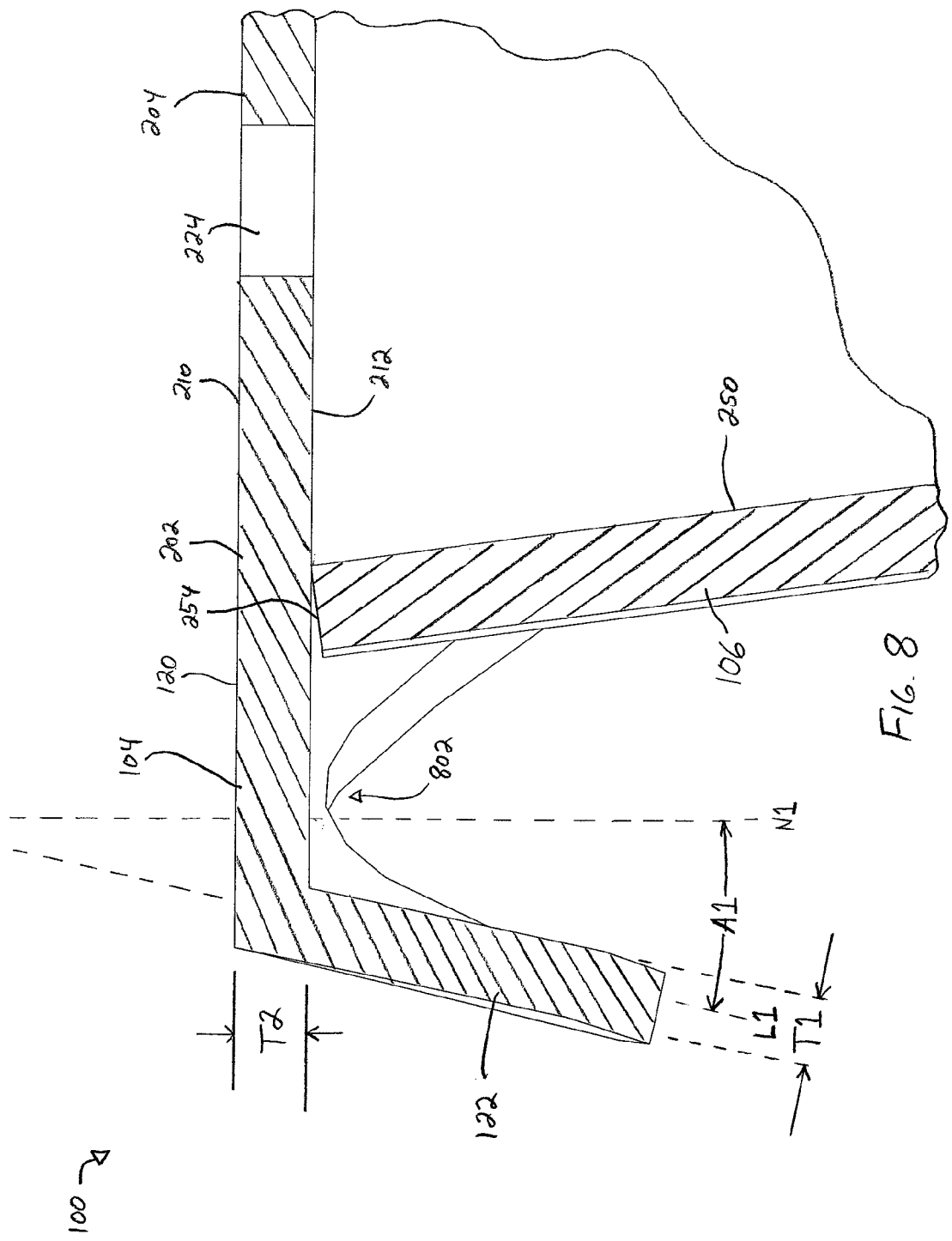
FIG. 8 is an enlarged cross-sectional side elevational view of portions of the system shown in FIG. 1.

FIG. 8 is an enlarged cross-sectional side elevational view of portions of exemplary pastry support system 100, including tray 104 and container 106. Tray 104 includes body 120, legs 122, and handle portion 802. Body 120 includes outer region 202, inner region 204, and legs 122. Outer region 202 includes top surface 210 and bottom surface 212. Inner region 204 includes apertures 224. Container 106 includes sidewall 250 and rim 254.

Tray 104 includes, in some embodiments, one or more handle portions 802. Handle portions 802 are arranged in a space between legs 122. Handle portion 802 provides a space where tray 104 is easily graspable with fingers from a single hand to move tray 104, such as between a generally flat surface and a top of container 106. Handle portion 802 allows a portion of body 120 to be grasped.

In some embodiments, tray 104 is made of plastic. Other embodiments include other materials, such as metal including stainless steel, aluminum, brass, or other metals or metal alloys. Yet other embodiments include wood, or other suitable materials.

Some embodiments of tray 104 are made of one or more of the following materials. Thermoactive materials include thermoplastic, a resin and adhesive polymer, or the like. "Thermoplastic" typically refers to a plastic that can, once hardened, be melted and reset. As used herein, the phrase "resin and adhesive polymer" refers to more reactive or more highly polar polymers than thermoplastic materials.

Examples of thermoplastics include polyamide, polyolefin (e.g., polyethylene, polypropylene, poly(ethylene-copropylene), poly(ethylene-coalphaolefin), polybutene, polyvinyl chloride, acrylate, acetate, and the like), polystyrenes (e.g., polystyrene homopolymers, polystyrene copolymers, polystyrene terpolymers, and styrene acrylonitrile (SAN) polymers), polysulfone, halogenated polymers (e.g., polyvinyl chloride, polyvinylidene chloride, polycarbonate, or the like), copolymers and mixtures of these materials, and the like. Examples of vinyl polymers include those produced by homopolymerization, copolymerization, terpolymerization, and like methods. Examples of homopolymers include polyolefins such as polyethylene, polypropylene, poly-1-butene, etc., polyvinylchloride, polyacrylate, substituted polyacrylate, polymethacrylate, polymethylmethacrylate, copolymers and mixtures of these materials, and the like. Examples of copolymers of alpha-olefins include ethylene-propylene copolymers, ethylene-hexylene copolymers, ethylene-methacrylate copolymers, ethylene-methacrylate copolymers, copolymers and mixtures of these materials, and the like. Other examples of thermoplastics include polypropylene (PP), polyethylene (PE), and polyvinyl chloride (PVC), copolymers and mixtures of these materials, and the like. Yet other examples of thermoplastics include polyethylene, polypropylene, polyvinyl chloride (PVC), low density polyethylene (LDPE), copoly-ethylene-vinyl acetate, copolymers and mixtures of these materials, and the like. Thermoplastics are examples of materials that can be injection molded.

Examples of resin and adhesive polymer materials include resins such as condensation polymeric materials, vinyl polymeric materials, and alloys thereof. Exemplary resin and adhesive polymer materials include polyesters (e.g., polyethylene terephthalate, polybutylene terephthalate, and the like), methyl diisocyanate (urethane or MDI), organic isocyanide, aromatic isocyanide, phenolic polymers, urea based polymers, copolymers and mixtures of these materials, and the like. Other examplary resin materials include acrylonitrile-butadiene-styrene (ABS), polyacetyl resins, polyacrylic resins, fluorocarbon resins, nylon, phenoxy resins, polybutylene resins, polyarylether such as polyphenylether, polyphenylsulfide materials, polycarbonate materials, chlorinated polyether resins, polyethersulfone resins, polyphenylene oxide resins, polysulfone resins, polyimide resins, thermoplastic urethane elastomers, copolymers and mixtures of these materials, and the like. Other exemplary resin and adhesive polymer materials include polyester, methyl diisocyanate (urethane or MDI), phenolic polymers, urea based polymers, and the like. Resins are also sometimes used for injection molding.

Examples of thermoactive materials include polymers derived from renewable resources, such as polymers including polylactic acid (PLA) and a class of polymers known as polyhydroxyalkanoates (PHA). PHA polymers include polyhydroxybutyrates (PHB), polyhydroxyvalerates (PHV), and polyhydroxybutyrate-hydroxyvalerate copolymers (PHBV), polycaprolactone (PCL) (i.e. TONE), polyesteramides (i.e. BAK), a modified polyethylene terephthalate (PET) (i.e. BIOMAX), and "aliphatic-aromatic" copolymers (i.e. ECOFLEX and EASTAR BIO), mixtures of these materials and the like.

In some embodiments, tray 104 is formed by injection molding. In other embodiments, tray 104 is formed from a solid piece of material, or multiple pieces of material. The material is formed by processes such as cutting, grinding, drilling, polishing, heating and bending. In yet other embodiments, tray 104 is formed by thermoforming, cold forming, or other suitable processes.

An advantage of some embodiments of tray 104 is that tray 104 is inexpensive to manufacture. For example, an injection molded or thermoformed part will often have low material cost. Such manufacturing techniques also allow tray 104 to be manufactured in large quantities, such that machinery cost per tray is also low. Manual labor costs are also low. Some embodiments also have a low weight, and therefore are inexpensive to transport. Low weight material is further advantageous in providing a tray 104 that does not add significant weight on top of a container 106. This reduces the chance of tipping container 106, because the container is not top heavy. Some embodiments of tray 104 have a weight in a range from about 0.2 ounces to about 6 ounces, and preferably in a range from about 1 ounce to about 3 ounces.

Some embodiments, however, are made of more expensive materials, such as metal, which may have higher material costs. This is sometimes preferred for improved aesthetics or durability. Similarly, more expensive manufacturing techniques may be preferred in some embodiments.

In some embodiments, tray 104 is made of a material that is machine washable. For example, some embodiments are made of materials suitable for withstanding heated water in a dishwashing machine, such as by dishwashers conforming to the NSF International dishwashing standards. In some embodiments, tray 104 is reusable because it is washable and also because it is significantly durable for repeated use and repeated washings. In some embodiments, a reusable tray is sufficiently durable that it resists cracking, shrinking, warping, or otherwise breaking or becoming permanently deformed during use and subsequent cleaning operations. In some embodiments, a reusable tray is sufficiently heavy to stay generally in place in a dishwashing machine. Other embodiments of tray 104 are disposable, such that tray 104 need not be washable, but rather have sufficient durability to be used at least one time. Some embodiments of tray 104 are made of a material that is recyclable.

Some embodiments of tray 104 are inflatable and deflatable. For example, one or more portions of tray 104 are hollow, the hollow portions defining an air chamber. The portions of tray 104 may include portions of body 120 (including portions of the inner region and/or the outer region) and optionally portions of one or more legs 122. A hole and valve are typically provided in communication with the air chamber to allow selective inflation or deflation of tray 104. Inflatable embodiments of tray 104 are typically made of a material including flexible plastic or rubber. Textile reinforcement is used in some embodiments for added strength and durability. Other embodiments include other materials, such as those described herein.

To inflate tray 104, pressurized air is provided (such as from a pump or by manually blowing with a user's mouth) to the valve. A nozzle may be used that matches the configuration of the valve. Inflation of tray 104 provides structural stability to tray 104. To deflate, the valve is opened to release the pressurized air. Deflation reduces the structural stability, such as allowing tray 104 to be folded or rolled, such as for more compact storage.

The thicknesses of portions of some embodiments of tray 104 are illustrated in FIG. 8. For example, leg 122 includes a thickness T1. T1 is typically in a range from about 0.001 inches to about 1 inch, and preferably from about 0.01 inches to about 0.3 inches. Similarly, body 120 includes a thickness T2. T2 is typically in a range from about 0.001 inches to about 1 inch, and preferably from about 0.01 inches to about 0.3 inches.

In some embodiments, leg 122 is formed to have a draft angle relative to body 120. A line normal to body 120 is illustrated as line N1. Draft angle A1 is the angle between N1 and a line L1 passing through the length of leg 122. A1 is typically in a range from about 1 degree to about 45 degrees, and more preferably from about 1 degree to about 10 degrees. Although leg 122 is illustrated as having an outward draft angle, an inward draft angle is included in some embodiments.

Figure 9:
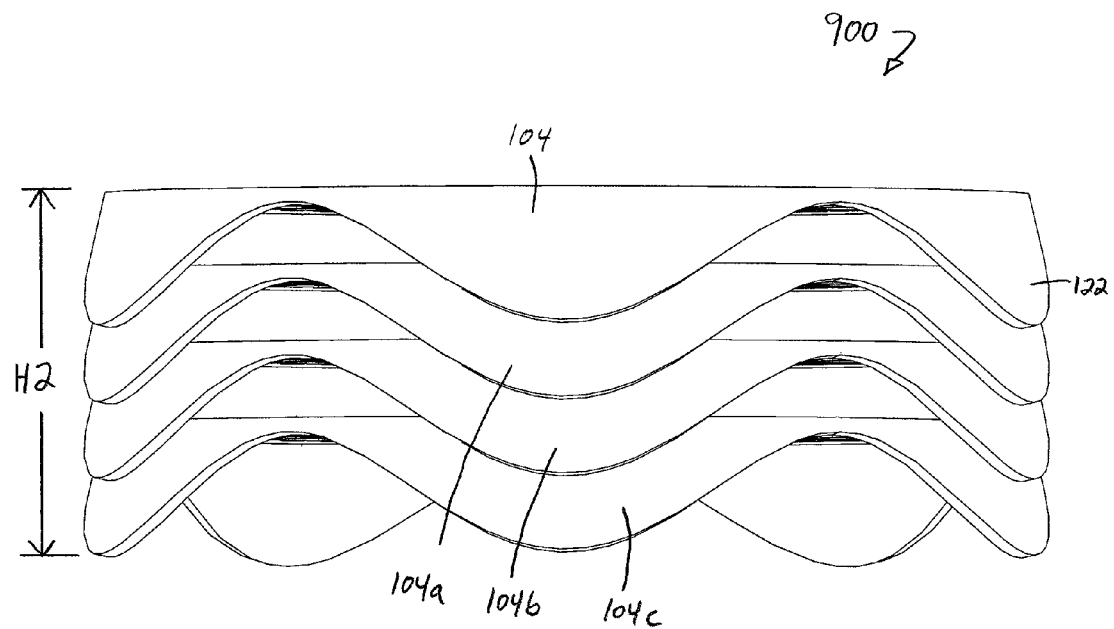
FIG. 9 is a side elevational view of an exemplary stack of trays.

FIG. 9 is a side elevational view illustrating a plurality of trays 104 arranged to form a stack 900. Stack 900 includes trays 104, 104a, 104b, and 104c. In embodiments having a draft angle, as described above with reference to FIG. 8, nesting is possible. Nesting saves space when storing trays 104, 104a, 104b, and 104c, by reducing the overall height needed for storage. For example, if trays were not configured to nest, the height required to store the trays would be equal to the height of a single tray 104 times the number of trays. In this example, having a total of four trays in stack 900, the total height H2 would be 4×H1 (the height of tray 104, as shown in FIG. 4). With nesting, however, the total height H2 is less than 4×H1. The total height H2 may be calculated using a nesting factor (N2) and number of trays (Q), according to the following formula: $H2=H1\times(1+(1-N2)\times(Q-1))$. The nesting factor N2 is the percentage of nesting that occurs with two nested trays. N2 is typically in a range from about 10% to about 90%, and preferably from about 30% to about 70%. Other embodiments include other nesting factors. In some embodiments, legs 122 are flexible and may be arranged generally parallel with body 120. In such embodiments, thickness H2 is about equal to the thickness T1 (shown in FIG. 8) times the number of trays (Q). Alternatively, if thickness T2 (also shown in FIG. 8) is greater than thickness T1, H2 is about equal to the thickness T2 times the number of trays (Q).

Figure 10:
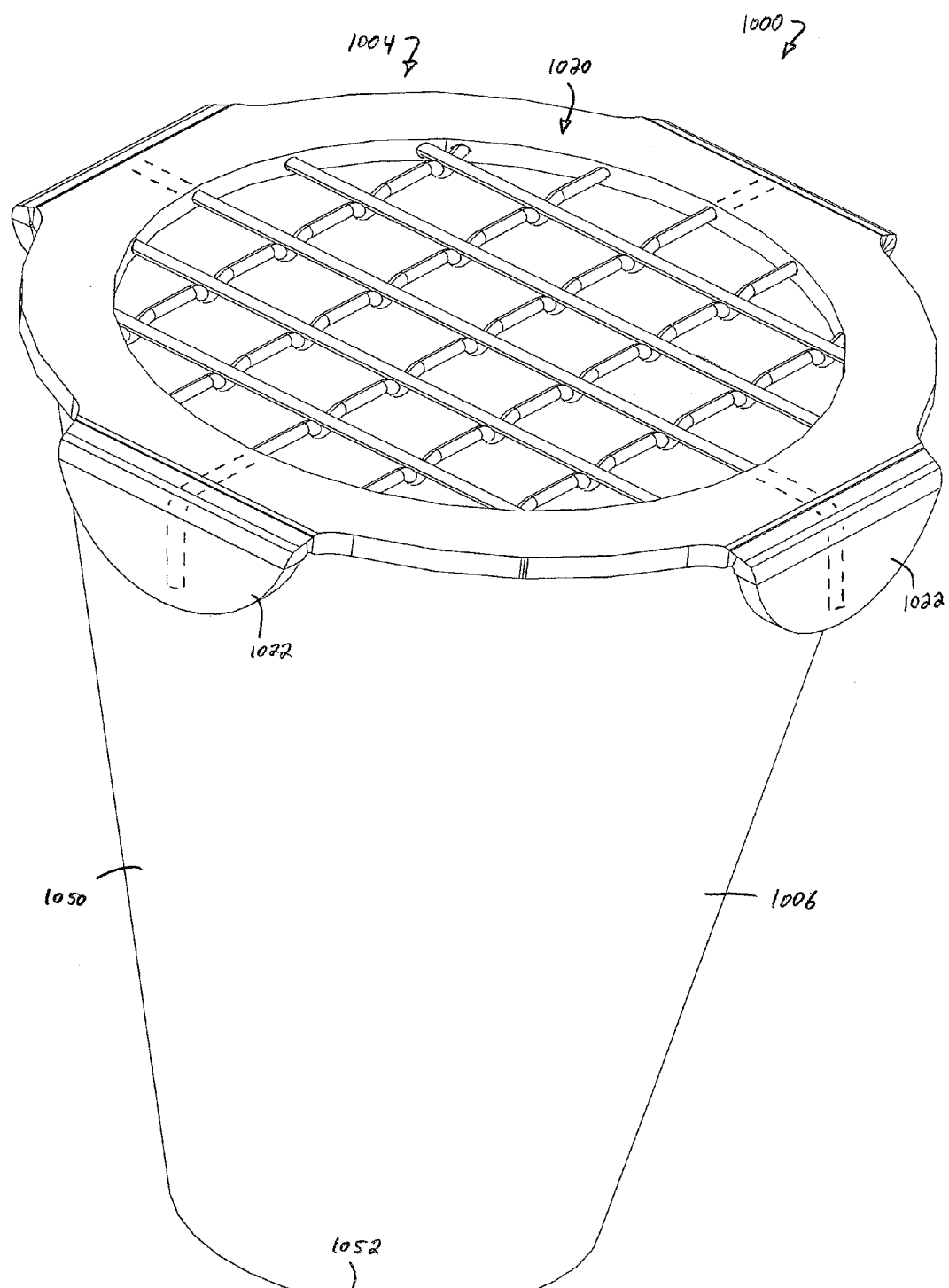
FIG. 10 is a perspective view of another exemplary pastry support system.

FIG. 10 is a perspective view of another exemplary pastry support system 1000. Pastry support system 1000 includes pastry 1002 (not shown in FIG. 10), tray 1004, and container 1006. Tray 1004 includes body 1020 and legs 1022. Container 1006 includes sidewall 1050, bottom 1052, and rim 1054 (not shown in FIG. 10).

In this embodiment, tray 1004 includes flexible legs 1022 that are able to bend relative to body 1020. The legs 1022 are shown in a bent position in FIG. 10, in which legs 1022 extend at least partially vertically downward from body 1020.

Figure 11:
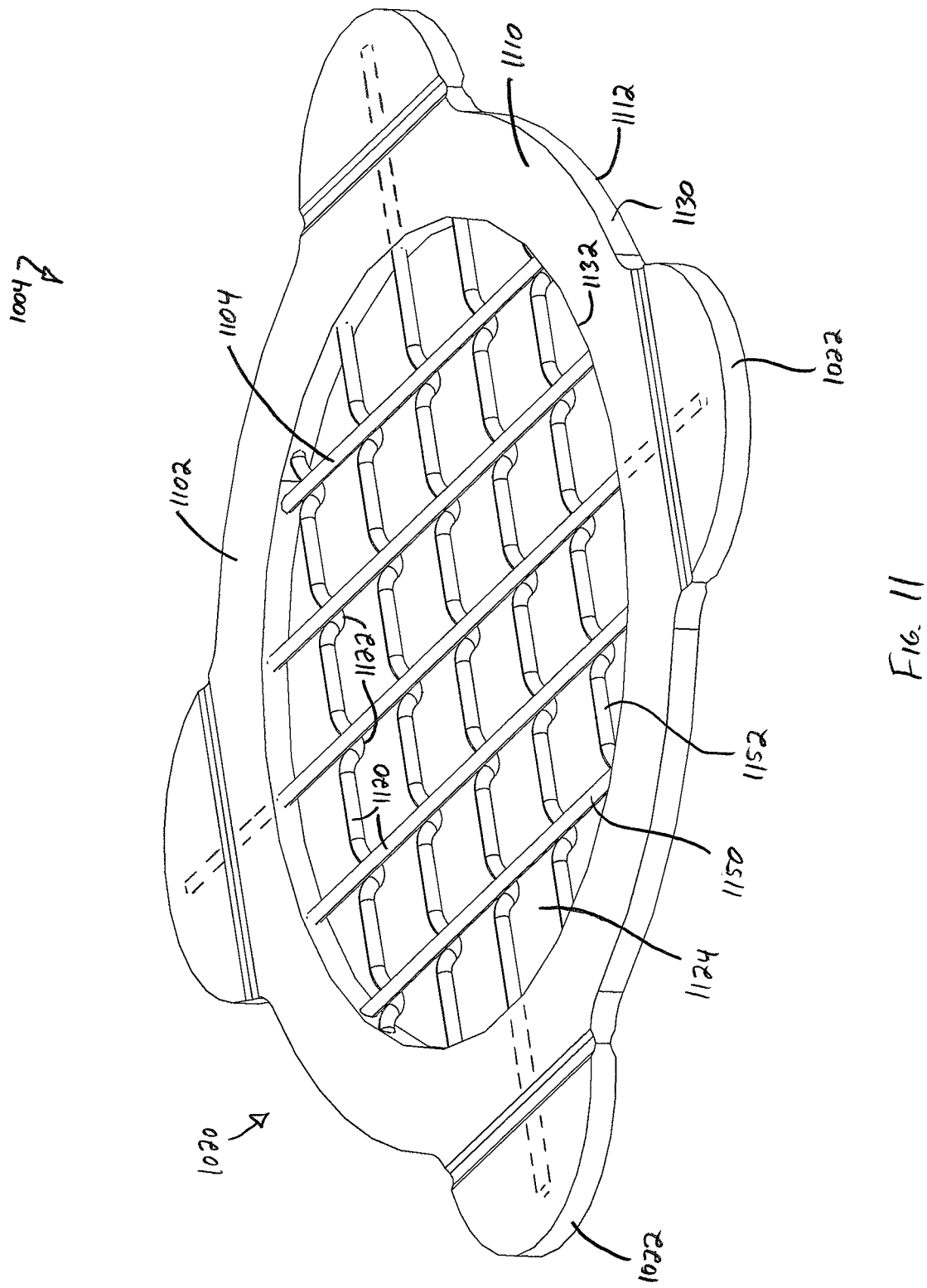
FIG. 11 is a perspective view of an exemplary tray of the system shown in FIG. 10.

FIG. 11 is a perspective view of exemplary tray 1004. Tray 1004 includes body 1020 and legs 1022. Body 1020 includes outer region 1102 and inner region 1104. Outer region 1102 includes top surface 1110, bottom surface 1112. Inner region 1104 includes top surface 1120, bottom surface 1122, and one or more apertures 1124. Inner region 1104 further includes a plurality of support wires 1150 and 1152.

In some embodiments inner region 1104 includes an arrangement of support wires 1150 and 1152. Support wires 1150 and 1152 are arranged to define top surface 1120 and bottom surface 1122 having apertures 1124 extending between the top surface 1120 and the bottom surface 1122. In this embodiment, support wires 1150 are arranged perpendicular to support wires 1152 in a crisscrossing arrangement. Support wires 1150 define a support plane. Portions of support wires 1152 are arranged within the support plane, but other portions extend below the support plane to cross support wires 1150. In some embodiments, top surface 1120 is substantially planar. In other embodiments, top surface 1120 and bottom surface 1122 are both substantially planar. Other embodiments include non-planar surfaces. Other embodiments include various other possible arrangements of support wires. For example, some embodiments include only support wires 1150. Other embodiments include concentric and radial support wires. Yet other embodiments include a coiled configuration.

In some embodiments, support wires 1150 and 1152 are made of metal or plastic. Stainless steel is used in some embodiments for its ability to be easily cleaned, thereby providing a sanitary surface for supporting a pastry. Stainless steel is also resistant to rusting when it becomes wet. Other embodiments include other materials, such as high tensile monofilament or other plastic materials, such as those described herein.

Support wires 1150 and 1152 are connected to and extend partially into outer region 1102. In some embodiments, tray 1004 is formed by molding outer region 1102 around ends of wires 1150 and 1152. Other embodiments include other manufacturing techniques. Further, in some embodiments inner region 1104 is formed of plastic or other materials.

Although ends of wires 1150 and 1152 are illustrated as being embedded within body 1020, other embodiments include other arrangements. For example, wires 1150 and 1152 are connected to a top or bottom surface of body 1020 in some embodiments.

Tray 1004 includes flexible legs 1022. Legs 1022 are illustrated in FIG. 11 in the unbent or storage position, in this position, legs 1022 are substantially planar with body 1020.

In some embodiments, apertures 1124 account for a large percentage of the total area of inner region 1104. An advantage is that wires 1150 and 1152 do not significantly block air, heat, and steam from being transferred between the space inside container 1006 (shown in FIG. 10) and a pastry (not shown in FIG. 11) supported by top surface 1120. The percentage of the inner region 1104 area filled by wires 1150 and 1152 is typically in a range from about 1% to about 60%, and preferably from about 5% to about 40%. Other embodiments include other percentages.

Figure 12:
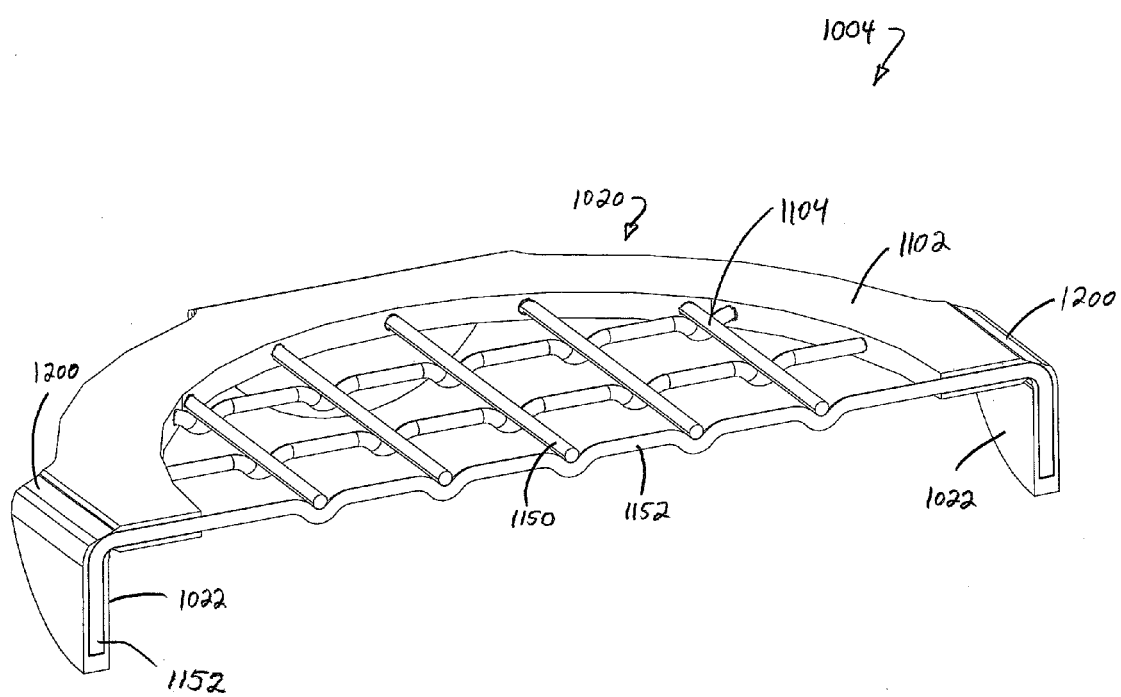
FIG. 12 is a perspective cross-sectional view of the tray shown in FIG. 11.

FIG. 12 is a perspective cross-sectional view of tray 1004. Tray 1004 includes body 1020 and legs 1022. Body 1020 includes outer region 1102 and inner region 1104. Inner region 1104 includes a plurality of support wires 1150 and 1152. Legs 1022 include joint 1200.

Legs 1022 are shown in FIG. 12 in a bent position, such that legs 1022 extend at least partially vertically downward from body 1020. Legs 1022 include joint 1200 in some embodiments. Joint 1200 is a portion of leg 1022 that is configured to bend. In some embodiments, a wire, such as one of wires 1152, extends at least partially into leg 1022 and through joint 1200. The material of outer region 1102 and leg 1022 is formed around portions of wire 1152. However, in the region of joint 1200, the material is thinned on one or both sides of wire 1152. The thinning of the material forms a region that has lower resistance to bending than outer region 1102 and the remainder of leg 1022 (not including joint 1200). As a result, when a bending force is applied to leg 1022 relative to body 1020, the leg 1022 will bend at joint 1200. The presence of wire 1150 (or 1152) in the leg (e.g. leg 1022) provides the strength to maintain the leg in the bent position. The same holds true for wires present in any of the other legs of tray 1004.

Figure 13:
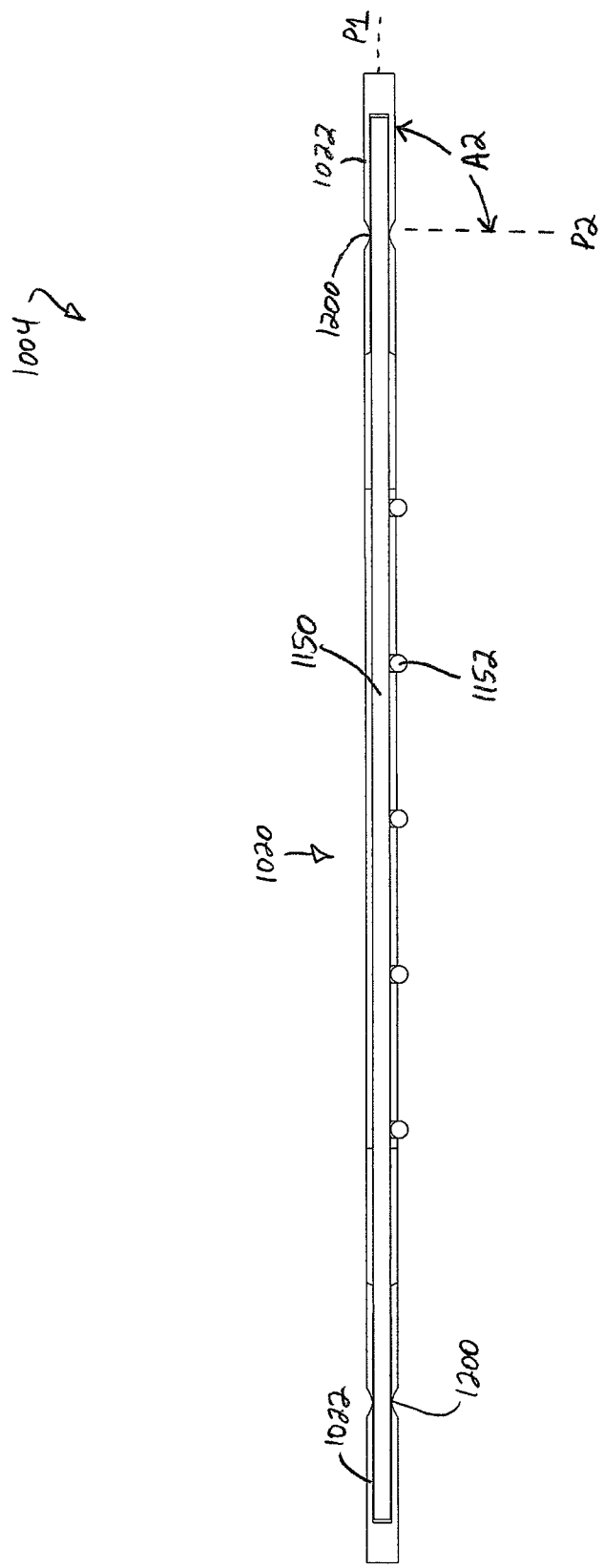
FIG. 13 is a cross-sectional side view of the tray shown in FIG. 11.

FIG. 13 is a cross-sectional side view of tray 1004. Tray 1004 includes body 1020 and legs 1022. Body 1020 includes wires 1150 and 1152. Leg 1022 includes joint 1200. The cross-section shown in FIG. 13 is perpendicular to the cross-section shown in FIG. 12.

Legs 1022 are illustrated in FIG. 13 as being in the unbent or storage position P1. Legs 1022 are flexible, such that they can be bent between position P1 and other positions, such as a second position P2. P2 typically extends at least partially vertically downward from body 1020. In some embodiments, position P2 has an angle A2 relative to position P1. Angle A2 is typically in a range from about 10 degrees to about 170 degrees, and preferably in a range from about 45 degrees to about 135 degrees, and more preferably in a range from about 70 degrees to about 110 degrees. Angles in a range from about 70 degrees to about 110 degrees are beneficial because a downward force has less (or no) horizontal component at such angles. The horizontal component of a downward force tends to cause legs 1022 to bend (e.g., toward position P1). As a result, the legs are able to support a larger weight without buckling or bending.

Figure 14:
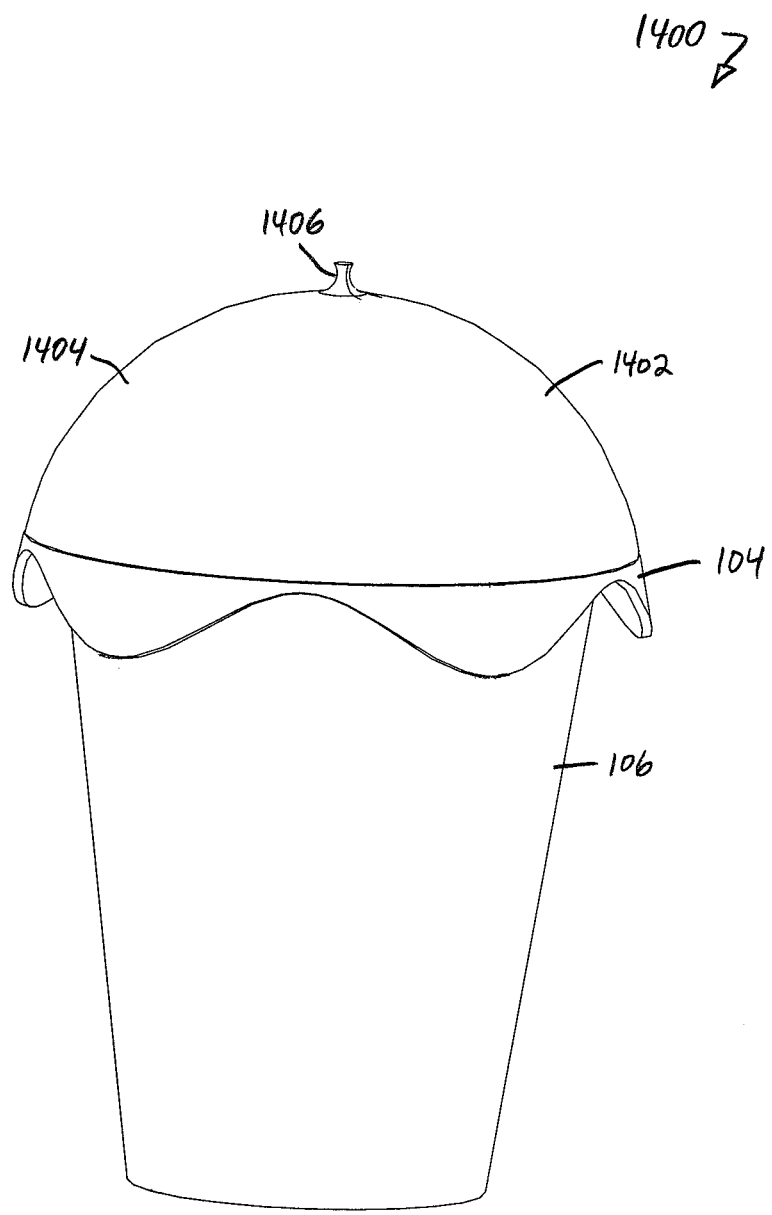
FIG. 14 is a side elevational view of another exemplary pastry support system.
Figure 15:
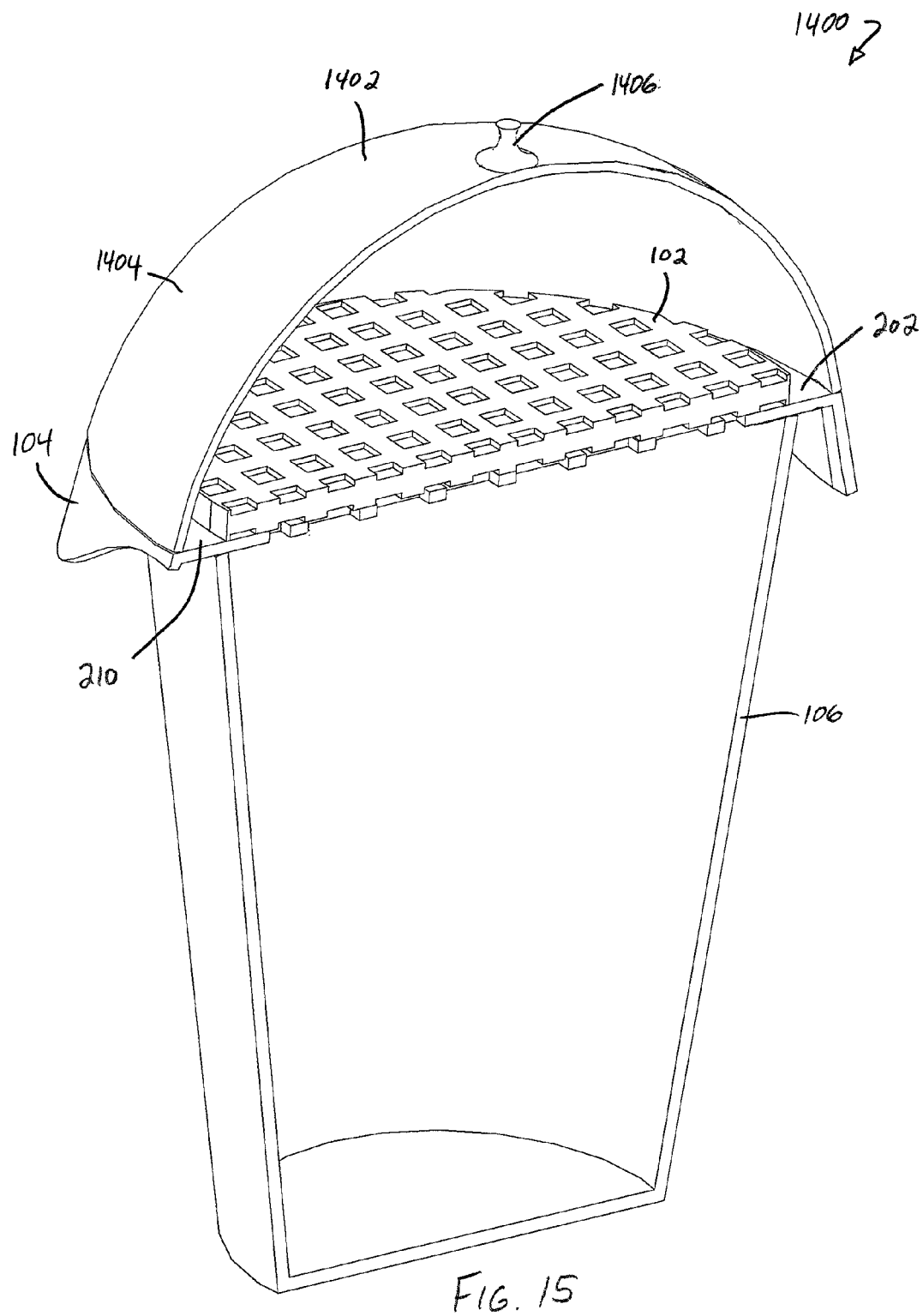
FIG. 15 is a perspective cross-sectional view of the system shown in FIG. 14.

FIGS. 14-15 illustrate another exemplary pastry support system 1400. FIG. 14 is a side elevational view. FIG. 15 is a perspective cross-sectional view. Pastry support system 1400 includes pastry 102, tray 104, container 106, and cover 1402. Tray 104 includes outer region 202 having a top surface 210. Cover 1402 includes cover portion 1404 and handle 1406.

Some embodiments of pastry support system 1400 include cover 1402. Cover 1402 operates to form a seal or partial seal with top surface 210 of outer region 202 of tray 104. When tray 104 is arranged on container 106, a seal or partial seal is also formed between tray 104 and container 106. As a result, an enclosed volume is defined with the addition of cover 1402 to include the area between cover 1402 and tray 104, as well as the area between tray 104 and container 106. Cover 1402 reduces heat and steam loss into the atmosphere by trapping the heat and steam within the interior of cover 1402. The trapped heat and steam act to warm and in some cases soften pastry 102. In particular, the heat and steam act to warm and moisten pastry 102 on both sides when the heat and steam is trapped by cover 1402. This occurs to a lesser extent without cover 1402.

Cover 1402 includes a cover portion 1404. In some embodiments, cover 1402 has a dome shape. Other embodiments include other shapes. For example, some embodiments are (upside-down) cup-shaped. In some embodiments, cover 1402 includes a handle 1406.

In some embodiments, pastry support system 1400 acts as a mini steam oven. The steam oven introduces steam into a cooking chamber defined by an interior surface of cover 1402 and the top surface 210. When the cooking chamber contains a pastry 102, steam from the heated liquid enters the cooking chamber and typically acts to heat and soften the pastry.

Figure 16:
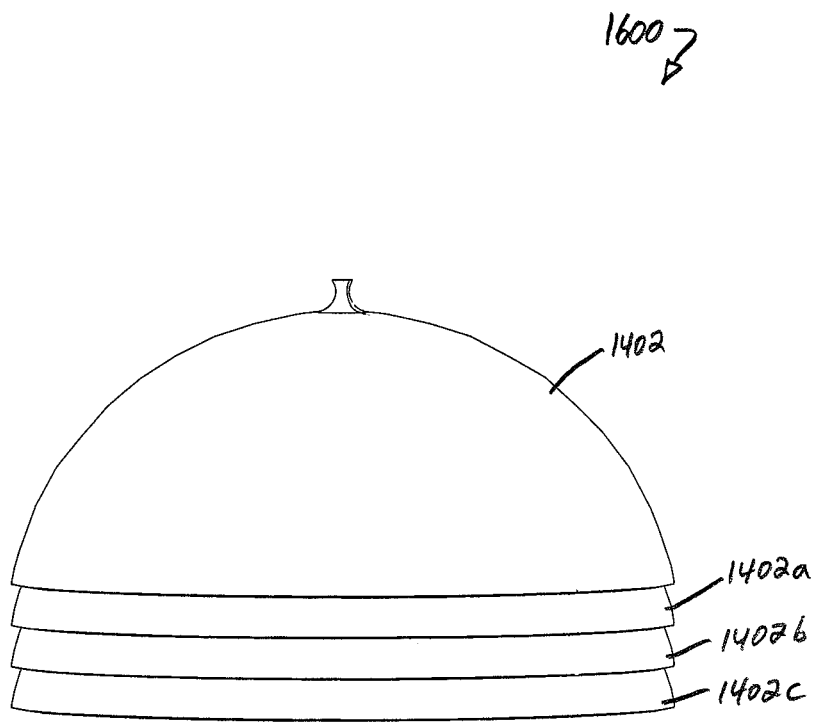
FIG. 16 is a side view of an exemplary stack of covers.

FIG. 16 is a side view of a stack 1600 of covers. The stack 1600 includes a plurality of covers 1402, 1402a, 1402b, and 1402c. In some embodiments, the covers are configured to nest within each other.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A tray and container combination for supporting a pastry, the combination comprising:
   the container having a sidewall and a bottom defining a volume for containing a heated liquid and for allowing an individual to drink the heated liquid, the sidewall defining a rim having a rim diameter,
   the tray comprising:
   a body formed of a liquid impermeable material and including:
      an outer region having a first top surface and a substantially planar first bottom surface, the first bottom surface being arranged and configured to rest on the rim of the container when arranged on the container, the outer region having a first outer periphery defining a first diameter that is greater than the rim diameter; and
      an inner region surrounded by and connected to the outer region and including a substantially planar second top surface aligned in a common plane with the first top surface of the outer region and a second bottom surface, the second top surface sized to support the pastry thereon, the inner region having a second outer periphery defining a second diameter that is less than the rim diameter and further including a plurality of apertures within the second outer periphery that extend between the second top surface and the second bottom surface to allow heat and steam from the heated liquid in the container to pass through the plurality of apertures to interact with the pastry; and
   at least one support leg connected to the body and extending at least partially vertically downward from the body such that the body is spaced from a generally flat surface when the tray is placed onto the generally flat surface.

2. The tray of claim 1, wherein one of the first top surface and the first bottom surface is smooth.

3. The tray of claim 1, wherein one of the first top surface, the second top surface, and the first bottom surface include one of ridges, bumps, protrusions, and recesses.

4. The tray of claim 1, wherein the outer region has no apertures extending therethrough.

5. The tray of claim 1, wherein the at least one leg comprises at least three legs each spaced from one another.

6. The tray of claim 5, wherein the at least three legs are bendable from a first position, in which the legs extend generally parallel to the body, to a second position, in which the legs are generally perpendicular to the body.

7. The tray of claim 1, wherein the at least one leg has a length in a range from about 0.2 inches to about 6 inches.

8. The tray of claim 1, wherein the at least one leg has a length in a range from about 0.5 inches to about 1 inch.

9. The tray of claim 1, wherein the outer region is generally ring-shaped and wherein the inner region is generally circular.

10. The tray of claim 9, wherein the outer region has a width defined by a difference between a first radius of the outer region and a second radius of the inner region, and wherein the width is in a range from about 0.5 inches to about 2 inches.

11. The tray of claim 9, wherein the inner region has a diameter in a range from about 2.9 inches to about 3.6 inches.

12. The tray of claim 9, wherein the inner region has a diameter in a range from about 3 inches to about 4 inches.

13. The tray of claim 1, wherein the inner region includes a plurality of wires.

14. The tray of claim 13, wherein at least one wire of the plurality of wires extends through the outer region and into the leg.

15. The tray of claim 1, wherein the at least one leg is rigidly connected to the body.

16. The tray of claim 15, wherein the at least one leg extends in a direction defining a draft angle relative to a line normal to the first bottom surface of the body, the draft angle being in a range from about 1 degree to about 45 degrees, the draft angle permitting the tray to be at least partially nested with a second tray.

17. The tray of claim 16, wherein the draft angle is in a range from about 1 degree to about 10 degrees.

18. The tray of claim 1, wherein the tray is reusable.

19. The tray of claim 1, wherein the outer region of the tray is arranged and configured to be supported by a plurality of containers, the plurality of containers having rims of varying diameters.

20. A pastry support system comprising the tray and container combination of claim 1 and further comprising a cover arranged and configured to enclose a pastry between the tray and the cover.

21. A tray and container combination for supporting a pastry, the combination comprising:
   the container having a sidewall and a bottom defining a volume for containing a heated liquid and for allowing an individual to drink the heated liquid, the sidewall defining a rim having a rim diameter, the tray comprising:
   a body formed of a liquid impermeable material and including:
      an outer region having a substantially planar first top surface and a substantially planar first bottom surface, the first bottom surface being arranged and configured to rest on the rim of the container when arranged on the container, the outer region having a first outer periphery defining a first diameter that is greater than the rim diameter;
      an inner region surrounded by and connected to the outer region and including a substantially planar second top surface and a substantially planar second bottom surface, the first top surface being aligned in a common plane with the second top surface, the second top surface arranged and configured to support the pastry thereon, the inner region having a second outer periphery defining a second diameter that is less than the rim diameter and further including a plurality of apertures within the second outer periphery that extend between the second top surface and the second bottom surface to allow steam from the heated liquid in the container to pass through the body to interact with the pastry; and
   at least three support legs spaced from each other and each being connected to the outer periphery of the outer region, the legs extending at least partially in a direction normal to the first bottom surface of the body.

22. The tray of claim 21, wherein the inner region comprises at least one wire, and wherein a portion of the wire further extends through the outer region and at least partially into the leg to support the leg in the first position and in the second position.

23. A tray and container combination for supporting a pastry, the combination comprising:
the container having a sidewall and a bottom defining a volume for containing a heated liquid and for allowing an individual to drink the heated liquid, the sidewall defining a rim having a rim diameter,
the tray comprising:
a reusable and durable machine washable body formed of a water impermeable material,
the body including:
a ring-shaped outer region having a first top surface and a substantially planar first bottom surface, the first bottom surface being sized and configured to rest on the rim when arranged on the container, and to rest on differently sized rims when arranged on other containers, wherein the first bottom surface is substantially free of apertures to substantially block heat and steam from escaping through the first bottom surface, the outer region having a first outer periphery defining a first diameter that is greater than the rim diameter;
an inner region surrounded by and connected to the outer region and including a substantially planar second top surface and a second bottom surface, the second top surface aligned in a common plane with the first top surface of the outer region and sized to support the stroopwafel thereon, the inner region having a second outer periphery defining a second diameter that is less than the rim diameter and further including a plurality of apertures within the second outer periphery that extend between the second top surface and the second bottom surface, wherein the apertures form at least a majority of the second top surface to allow heat and steam from the heated liquid in the container to pass through the inner region to interact with the stroopwafel; and
a plurality of support legs each connected to the body and extending at least partially vertically downward from the body such that the body is spaced from a generally flat surface when the tray is placed onto the generally flat surface.

* * * * *